E. Learned,
Elevator,
N° 6,085,   Patented Feb. 6, 1849.

UNITED STATES PATENT OFFICE.

ELIJAH LEARNED, OF BOSTON, MASSACHUSETTS.

HOISTING APPARATUS.

Specification of Letters Patent No. 6,085, dated February 6, 1849.

*To all whom it may concern:*

Be it known that I, ELIJAH LEARNED, of Boston, in the county of Suffolk and State of Massachusetts, have invented a new or Improved Hoisting Apparatus or Machine; and I do hereby declare that the same is fully described and represented in the following specification and accompanying drawings, letters, figures, and references thereof.

Figure 1:
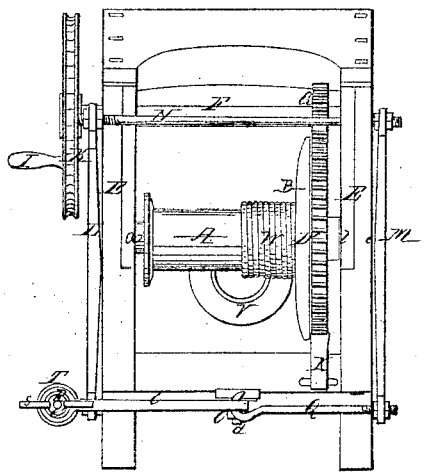
Figure 2:
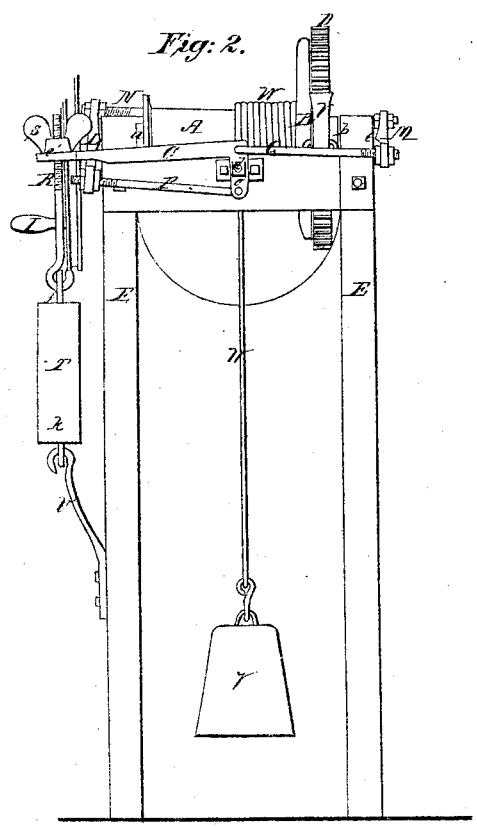
Figure 3:
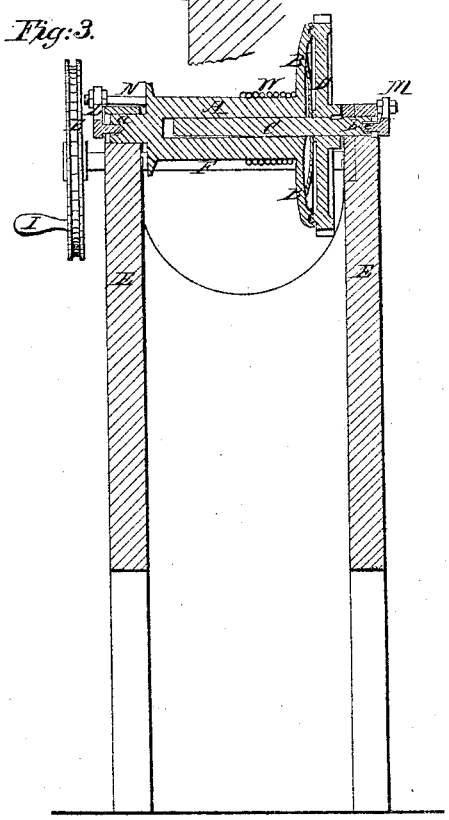

Of the said drawings Figure 1, denotes a top view of my said machine. Fig. 2, is a front end elevation. Fig. 3, is a vertical section taken through and in line of the axis of the windlass barrel to be hereinafter described.

On the said figures A, exhibits a windlass barrel made tubular or hollow nearly throughout its length and with a journal $a$, at one end, and a circular disk or plate B, fixed upon or to its other end as seen in the drawings. The said hollow barrel receives and turns freely upon a long shaft C, which has a large spur gear or cogged wheel D, fixed upon it, and in such manner as to rest against the friction disk B, as seen in Fig. 3, the said shaft C, having a journal $b$, on its outer end. The two journals $a$, and $b$, of the barrel A, and shaft C, are supported and turn in suitable boxes or bearings applied to the upper part of the sustaining frame E, of the machine the said frame being constructed in such manner as circumstances may require.

F, is a main driving shaft which has a pinion G, fixed upon it and made to engage with and turn the gear D, when the shaft F is revolved. The said shaft F, may be put in rotation by power applied to a crank I, or a grooved pulley wheel K, or by any other suitable substitute therefor.

Figure 4:
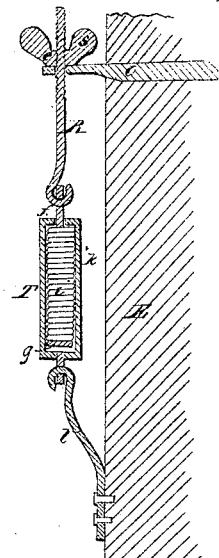

L, and M, are two levers connected at their rear ends by a cross bar N, which extends through them and has screws and nuts on its ends as seen in Fig. 1, of the drawings. One of the said levers has a pivot $e$, extended from it and into a corresponding hole made in the end of the journal $b$, of the shaft C. The other lever has a similar pivot extended from it, and made to rest in a similar manner on and against the journal $a$, of the windlass bearing. Both of these levers are connected with a bent lever O, by rods P, Q, which are respectively jointed to said lever O, at equal distances from its fulcrum $d$, as seen in Fig. 2. The outer end of the long arm of the said lever O, has a screw $e'$, of a screw rod R, extending up through it; a lever screw nut S, being screwed upon the screw $e'$, and above the lever O, as seen in the drawings. The lower end of the said rod R, is jointed to the index rod $f$, of a helical spring balance T, held in position as seen in Fig. 2, by a hook U, made to project from the frame of the machine. A vertical section of said spring balance is shown in Fig. 4, in which $f$, denotes the index rod, having a head $g$, on its inner end.

$i$, is a helical spring wound around the rod and resting at one end against said head $g$, and at the other against the upper end of the case or box $k$. Screwing down the screw nut S, so as to raise the rod R, and with it the index rod against its spring, will create a depression of the long arm of the lever O, in such manner as to cause the two levers L, M, to be drawn toward each other and thereby press the friction disk B, close against the side of the wheel D. Now whatever may be the amount of weight V, suspended to the chain or rope W, which is wound around and depends from the windlass barrel, by screwing down the screw nut S, sufficiently the amount of pressure of the plate B, against the wheel D, necessary to cause the two to adhere with friction and revolve together may be obtained. Thus it will be seen that the rotations of the barrel A, are effected by those of the wheel D, and through friction generated by pressure of the disk B, in contact with the wheel.

It is often the case where a hoisting machine is erected in the upper part of a building, and over a series of openings in the floors beneath, that a box or parcel of goods while being hoisted from one story to the other will get caught by a corner swinging under the floor, and as the hoisting operation goes on a great and often highly injurious strain is produced on the gearing and machinery in consequence of the same. Besides in letting down the hoisting rope that winds around the barrel the whole machinery often has to be reversed, thus occasioning a great expenditure of time for the descent of the fall rope. All this is obviated by my improved apparatus; for when a box or parcel gets caught, the barrel will stop revolving although the wheel D, will continue in motion. By unscrewing the screw nut S, sufficiently, the weight of the fall rope will cause the windlass barrel to unwind, and the fall rope to descend with great velocity which may be regulated at pleasure.

Another advantage resulting from the above described mechanism is that the main driving power can be kept in continual application and without the intermittent cessations which generally are required in other hoisting machines, during such times as the fall rope is made to descend. The aforedescribed hoisting machinery may be applied to pile driving engines or various other machines.

It it not essential to the operations of my machine that a weighing apparatus be used as the rod R, may be jointed directly to the hook U, although it will often be found convenient to have such weighing apparatus in order to approximately determine the weight of any body.

A pawl X, is applied to the cogged wheel D, so as to prevent the fall of the weight while being elevated, and whenever the elevating power is removed from the machinery.

What I claim as my invention is—

The friction disk B, the driving wheel D, and the system of levers or leverage applied thereto as combined together and with the hollow windlass barrel and made to operate substantially as specified, and I also claim the combination of the same and the spring weighing apparatus which serves not only to present to the action of the friction apparatus under certain circumstances the relief of a spring, but also to determine the approximate weight of a body raised by the machinery.

In testimony whereof I have hereto set my signature this thirteenth day of May, A. D. 1848.

ELIJAH LEARNED.

Witnesses :
  R. H. EDDY,
  CALEB EDDY.